(12) United States Patent
Lange

(10) Patent No.: US 7,090,298 B2
(45) Date of Patent: Aug. 15, 2006

(54) ADJUSTMENT FITTING FOR A SEAT BACK

(75) Inventor: Dieter Lange, Petershagen (DE)

(73) Assignee: Faurecia Autositze GmbH & Co. KG, Stadthagen (DE)

( * ) Notice: Subject to any disclaimer, the term of this patent is extended or adjusted under 35 U.S.C. 154(b) by 199 days.

(21) Appl. No.: 10/847,907

(22) Filed: May 18, 2004

(65) Prior Publication Data

US 2004/0258101 A1    Dec. 23, 2004

(30) Foreign Application Priority Data

Jun. 23, 2003    (DE) ............................... 103 28 300

(51) Int. Cl.
*B60N 2/02* (2006.01)
*B60N 2/22* (2006.01)
*B60N 2/235* (2006.01)

(52) U.S. Cl. ....................................... 297/362; 297/367

(58) Field of Classification Search ................ 297/367, 297/366, 369, 373, 362
See application file for complete search history.

(56) References Cited

U.S. PATENT DOCUMENTS

| | | | | |
|---|---|---|---|---|
| 5,277,672 A * | 1/1994 | Droulon et al. | ......... | 297/362 X |
| 6,543,851 B1 * | 4/2003 | Schillak | ...................... | 297/367 |
| 6,619,743 B1 * | 9/2003 | Scholz et al. | ................ | 297/362 |
| 6,637,821 B1 * | 10/2003 | Lee et al. | .................... | 297/362 |
| 6,755,470 B1 * | 6/2004 | Iwata et al. | .................. | 297/362 |
| 6,918,635 B1 * | 7/2005 | Finner et al. | ................ | 297/362 |
| 2005/0110322 A1 * | 5/2005 | Cha | ............................ | 297/362 |
| 2005/0179297 A1 * | 8/2005 | Finner et al. | ................ | 297/362 |

FOREIGN PATENT DOCUMENTS

| | | | | |
|---|---|---|---|---|
| DE | 19938666 A1 | 2/2001 | | |
| JP | 03118005 A * | 5/1991 | ................. | 297/362 |
| JP | 05317136 A * | 12/1993 | ................. | 297/367 |

* cited by examiner

*Primary Examiner*—Rodney B. White
(74) *Attorney, Agent, or Firm*—Bourque & Associates, P.A.

(57) ABSTRACT

An adjustment fitting for a seat such as an automobile seat including a fixed fitting operatively attached to a fixed seat area and a fitting that is operatively attached to a moveable seat area. The adjustment fitting is adjustable via a rotatable fitting. The fixed fitting part and fitting are connected together via a rotating adjusting device. Thus, an adjustment and locking mechanism that determines a position of the fixed fitting part and fitting with respect to each other provides a wobble drive. The rotating adjusting device includes a driven rotating adjusting element and an eccentric element rotatable about a swivel axis. The eccentric element includes crimped wedge segments having wide faces pushed apart by a spring. The eccentric ring is rotatable on a bearing shell with radial play that includes an outer bearing surface of Teflon. The bearing shell grips a collar of the fitting part that supports a collar of the driven rotating adjusting element so that it may rotate. The rotating adjusting element includes fixed followers that rest on the narrow faces of the wedge segments and are displaced with respect to the eccentric ring.

9 Claims, 9 Drawing Sheets

US 7,090,298 B2

ADJUSTMENT FITTING FOR A SEAT BACK

TECHNICAL FIELD OF THE INVENTION

The invention relates to an adjustment fitting for a seat and more particularly, to a tilt adjustment fitting for a seat back.

DESCRIPTION OF THE RELATED ART

DE 199 38 666 A1 discloses an adjustment fitting. A rotating adjusting element is connected so that it may not rotate with an eccentric ring that, together with a crimped wedge segment, forms an eccentric element that may rotate about a swivel axis. The drive of the wedge segments result along the rotation direction via the eccentric ring firmly affixed or attached with the rotating adjusting element that is shaped as a follower ring. The follower ring or bushing of the rotating adjusting element and the eccentric ring or follower are formed of two separate components that transfer torque via a shaped friction fit.

In this design, the rotating adjusting element must be rotated against the force of the two springs pressing the wide face segments of the wedge segments until the follower ring rests on one of the two wedges. Unfortunately, a breakaway moment interferes with the function of the fitting because of this design. This results because the rotating motion is not uniform, causing chattering when the fitting is adjusted.

SUMMARY OF THE INVENTION

The present invention is an adjustment fitting that provides easy, smooth, chatter-free rotating adjustment.

Specifically, the adjustment fitting for a seat back of a seat such as an automobile seat, comprises a fitting part operatively mounted to the seat and a fitting operatively mounted to a moveable seat area. The adjustment fitting also includes a rotatable fitting operatively connected to the fitting via a rotating adjusting device for adjusting the fitting, and an adjustment and locking mechanism, for adjusting the fitting part and the fitting with respect to each other. The fixed fitting part and the fitting are a preferably a wobble drive. The rotating adjusting device includes a driven rotating adjusting element and an eccentric element rotatable about a swivel axis and an eccentric ring and wedge segments tilted toward each other and crimped about an axis of rotation. The plurality of wedge segments have sides urged apart by a spring, wherein the eccentric ring is rotatable on a bearing shell and displaced radially. The bearing shell has an outer bearing surface of Teflon or similar material that grips a collar of the fitting part that supports a collar of the driven rotating adjusting element so that it may rotate. The rotating adjusting element includes a plurality of followers that rest on faces of the wedge segments and are displaced with respect to the eccentric ring.

The adjustment fitting according to the invention includes a driven rotating adjusting element that rests without tension within the overall system. It may be rotated easily until a point that a follower affixed or attached to the rotating adjusting element comes to rest on narrow faces of wedge segments. Even when rotation is continued past this point, as is required to adjust the fitting, motion continues easily and without chatter. The adjustment fitting according to the invention operates chatter-free and easily.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
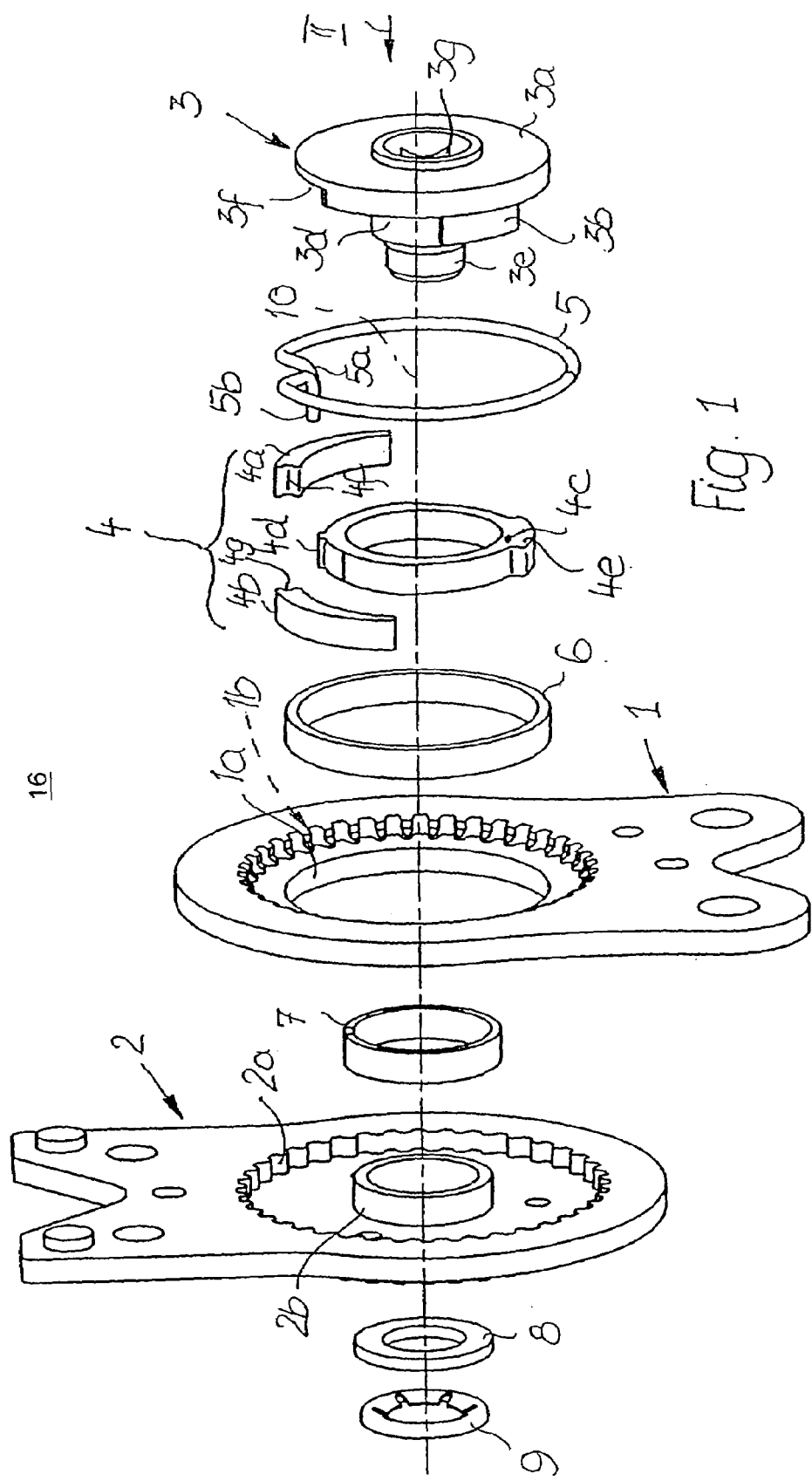
FIG. 1 is an exploded view of an adjustment fitting according to the present invention.
Figure 2:
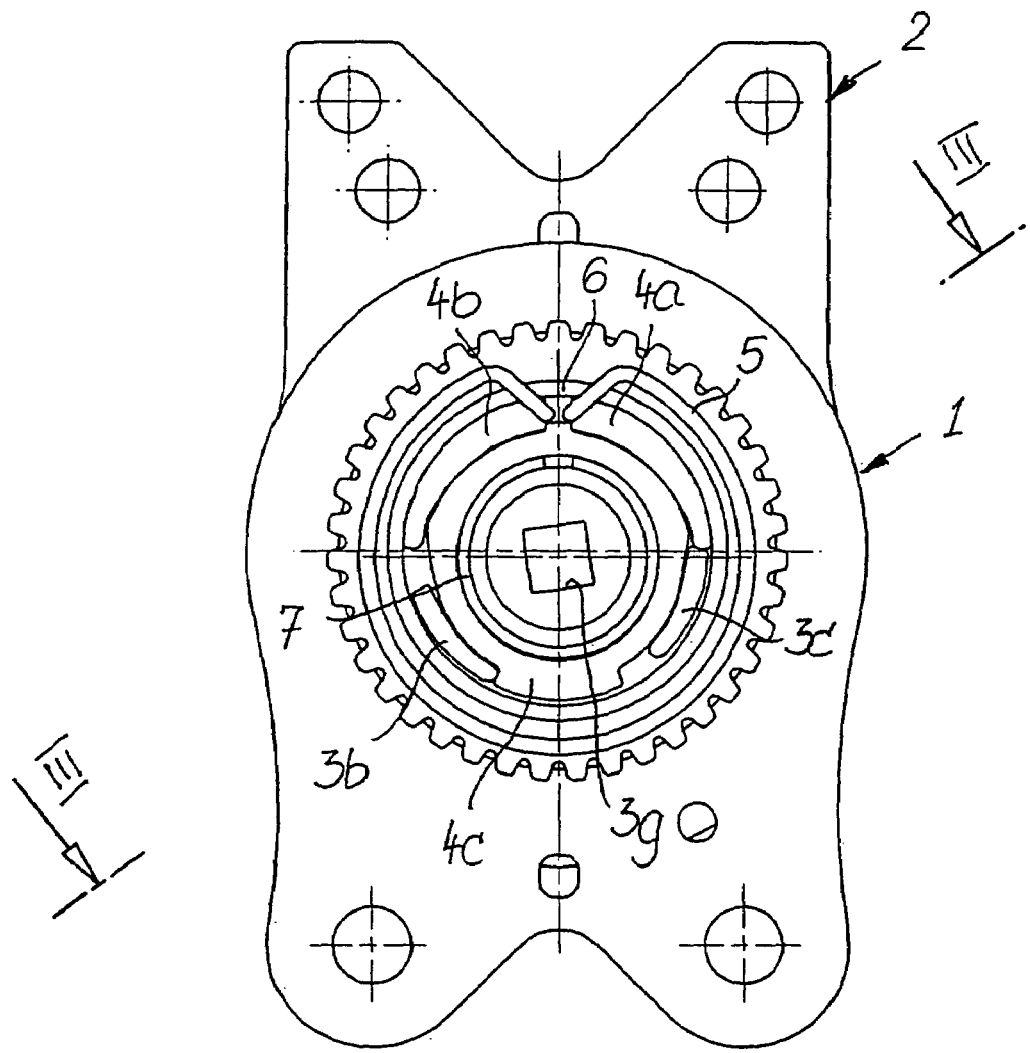
FIG. 2 is a front view of the adjustment fitting shown in FIG. 1 taken along a rotation axis and without a portion of the right area of the adjustment fitting 3.

FIG. 1 shows an adjustment fitting 16 according to the present invention. The adjustment fitting 16 may be used as a tilt adjustment fitting for a seat back of a seat such as an automobile. The adjustment fitting 16 includes a fitting 2 that may be rotated and is affixed or operatively attached to the seat back of an automobile or similar seat (not shown).

The adjustment fitting 16 also includes a fitting part 1. The fitting part 1 and the fitting 2 have operational toothed portions or regions 1b, 2a, respectively, that engage each other but which have a different number of teeth. The toothed portions 1b, 2a form a wobble drive by use of a driven eccentric element 4. The fitting part 1 is operatively attached or affixed to the seat and includes the functional toothed portion 1b on a side of the fitting part 1 facing the fitting 2. The fitting 2 is rotatably mounted to the fitting part 1. The functional toothed portion 1b of the fitting part 1 is formed as an exterior toothed portion and is operatively engaged with the functional toothed portion 2a of the fitting part 2 that is formed as an interior toothed portion. The fitting part 2 is rotatable and includes a central head 2b that is gripped by a bearing shell 7. The bearing shell 7 has a slot and an external bearing layer of Teflon.

A second bearing shell 6 is fitted into a hole 1a in the fitting part 1 and operatively attached or affixed to the seat. The second bearing shell 6 has an inner bearing surface coated with Teflon or other similar material having similar properties.

A rotating adjusting element 3 is driven either directly, e.g., by a hand wheel, or by a rotatable drive via an inner square hole 3g. The rotating adjusting element 3 is, preferably, one piece. The adjustable element 3 has a washer 3a on which two followers 3b and 3c rest along a direction of rotation. A central collar 3d is operatively mounted in an interior of the central head 2b so that it may rotate within the fitting part 2. A stepped shoulder 3e is adjacent the central collar 3d. The outside or larger diameter of the stepped shoulder 3e is gripped by a spacer washer 8 that is operatively attached or affixed by means of a detent washer 9 resting on a step.

Figure 3:
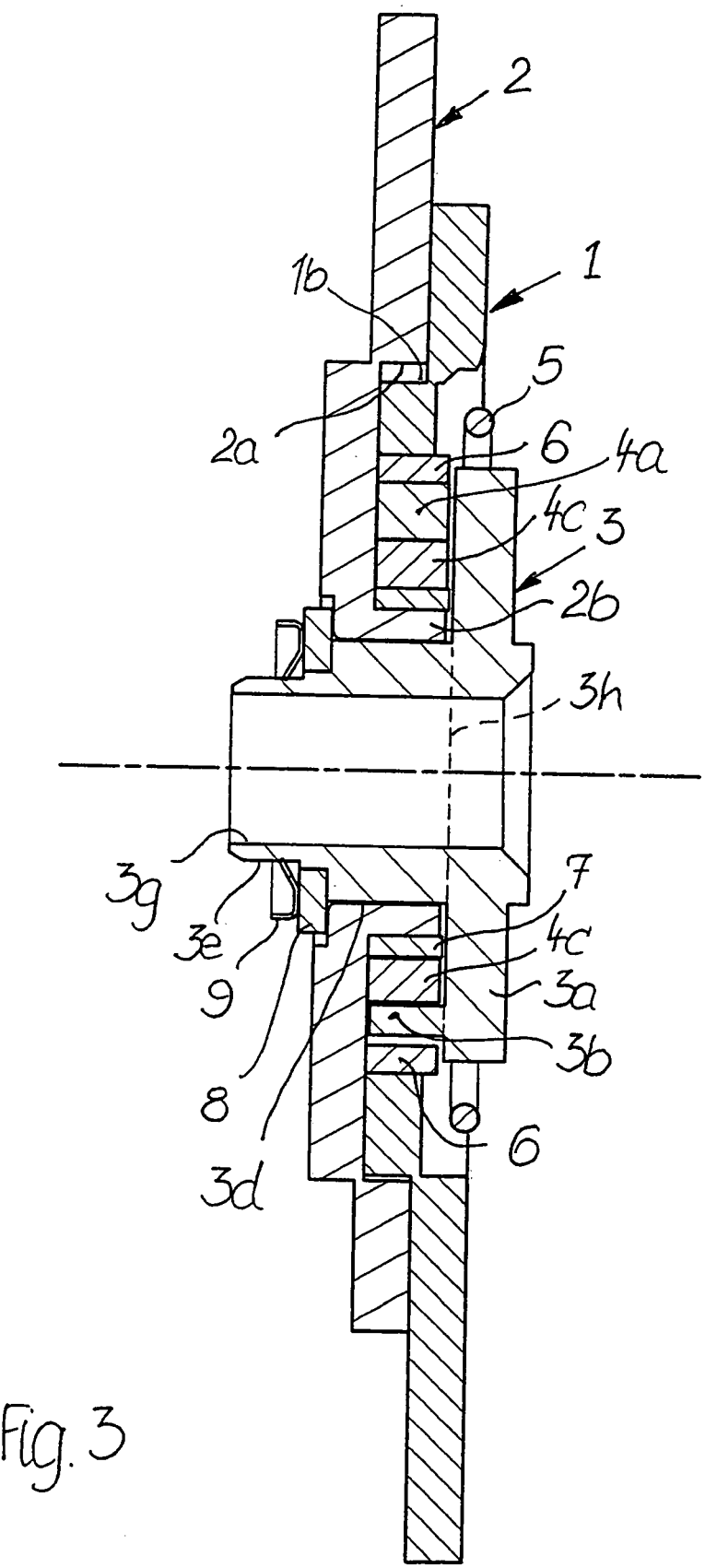
FIG. 3 is a cross-sectional view taken along Plane III—III of FIG. 2.

FIG. 3 shows a theoretical splitting plane 3h and a location of the washer 3a of the rotating adjusting element 3. The rotating adjusting element 3 is cut away in order to achieve the representations as that shown in FIGS. 2 through 6a.

The washer 3a of the rotating adjusting element 3 is gripped by an Omega spring 5 that includes two angled leg ends 5a and 5b that extend parallel to a rotation axis 10 as shown in FIG. 1. The cropped and angled leg ends 5a and 5b rest in a cut-out area 3f of the washer 3a of the rotating adjusting element 3.

The eccentric element 4 includes an eccentric ring 4c and wedge segments 4a and 4b positioned on it so that it may rotate and swivel. The wedge segments 4a and 4b have faces that are bent around the rotation axis 10 and point toward each other. The faces have notches 4f and 4g into which the leg ends 5a and 5b of the Omega spring 5 engage. The leg ends 5a and 5b press the two wide faces of the wedge segments 4a and 4b apart.

The eccentric ring 4c includes a rest notch 4d on its upper apex that works together with the wide faces of the wedge segments 4a and 4b. Further, the eccentric ring 4c has a rest notch 4e at its lower apex for the follower 3b or 3c of the rotating drive engages.

Figure 4:
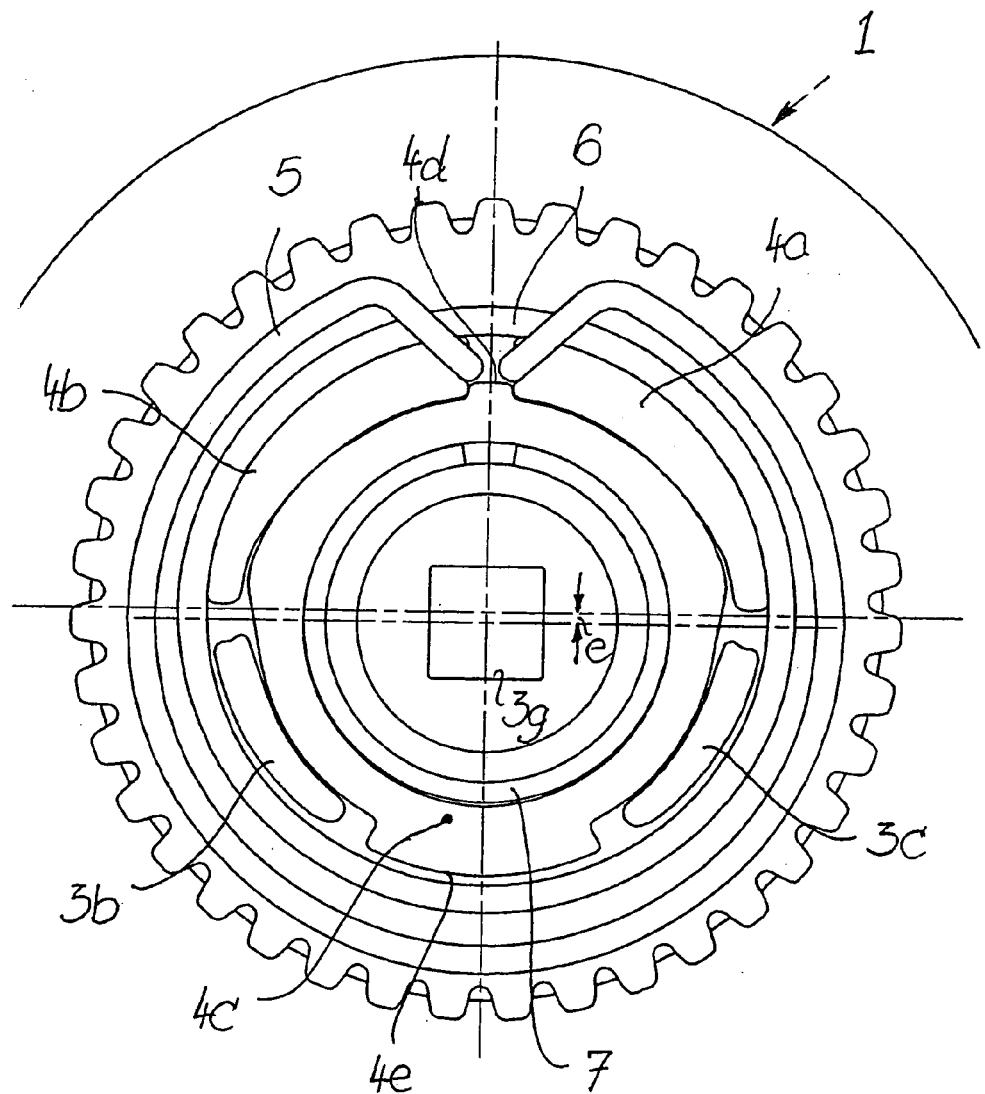
FIG. 4 is a front view of the adjustment fitting taken along a rotation axis and without a portion of a right area of the adjustment fitting similar to FIG. 2.
Figure 4A:
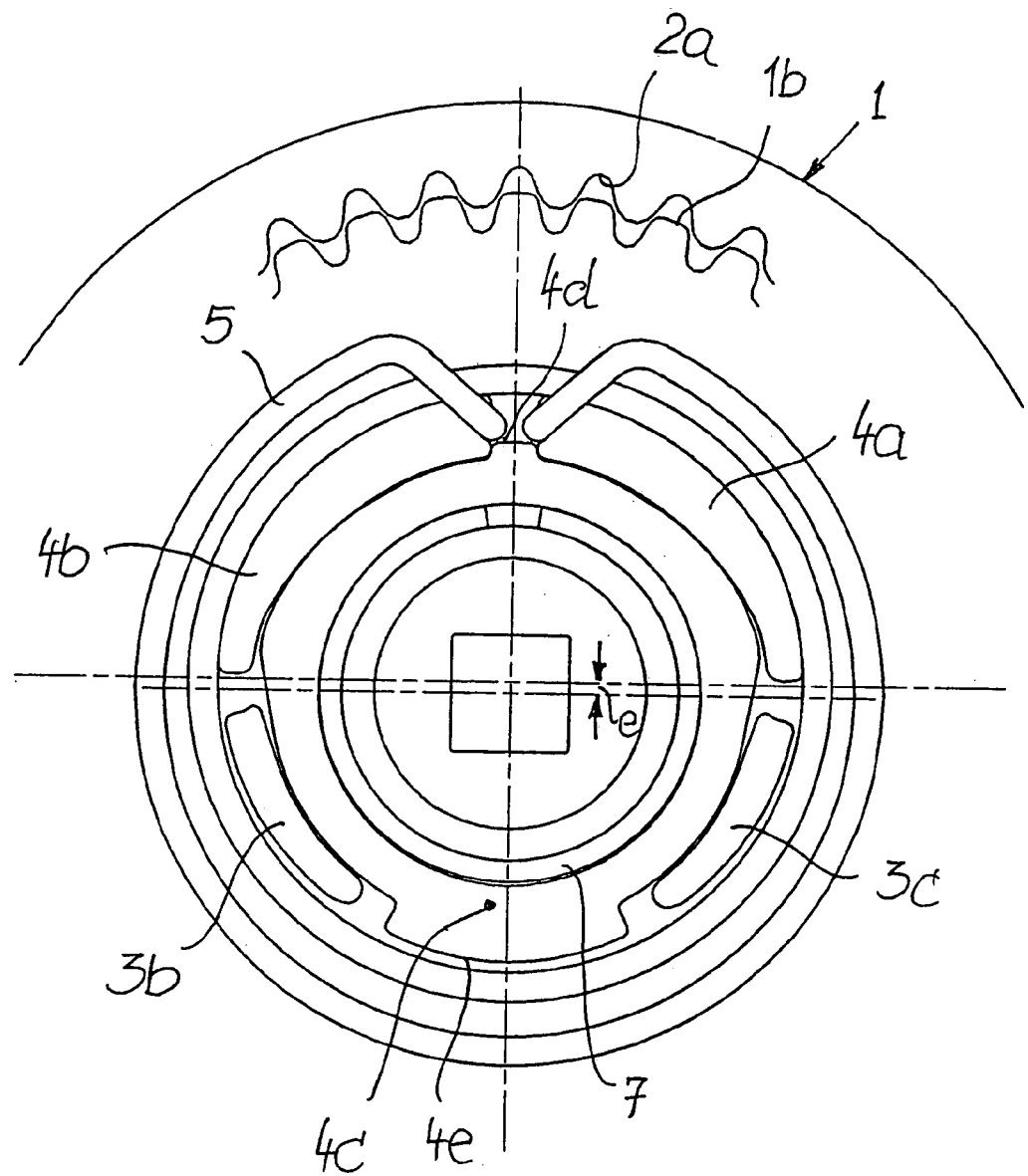
FIG. 4a is a front view of the adjustment fitting according to FIG. 4 showing only a portion of the teeth, wherein the teeth of the two fitting pieces are engaged with each other.

FIGS. 4 and 4a is a front view taken along arrow II in FIG. 1 with the cutaway washer area 3a of the rotating adjusting element 3 removed. This design and the positioning of the various components of the adjustment fitting 16 is novel and not known in practice.

Figure 5:
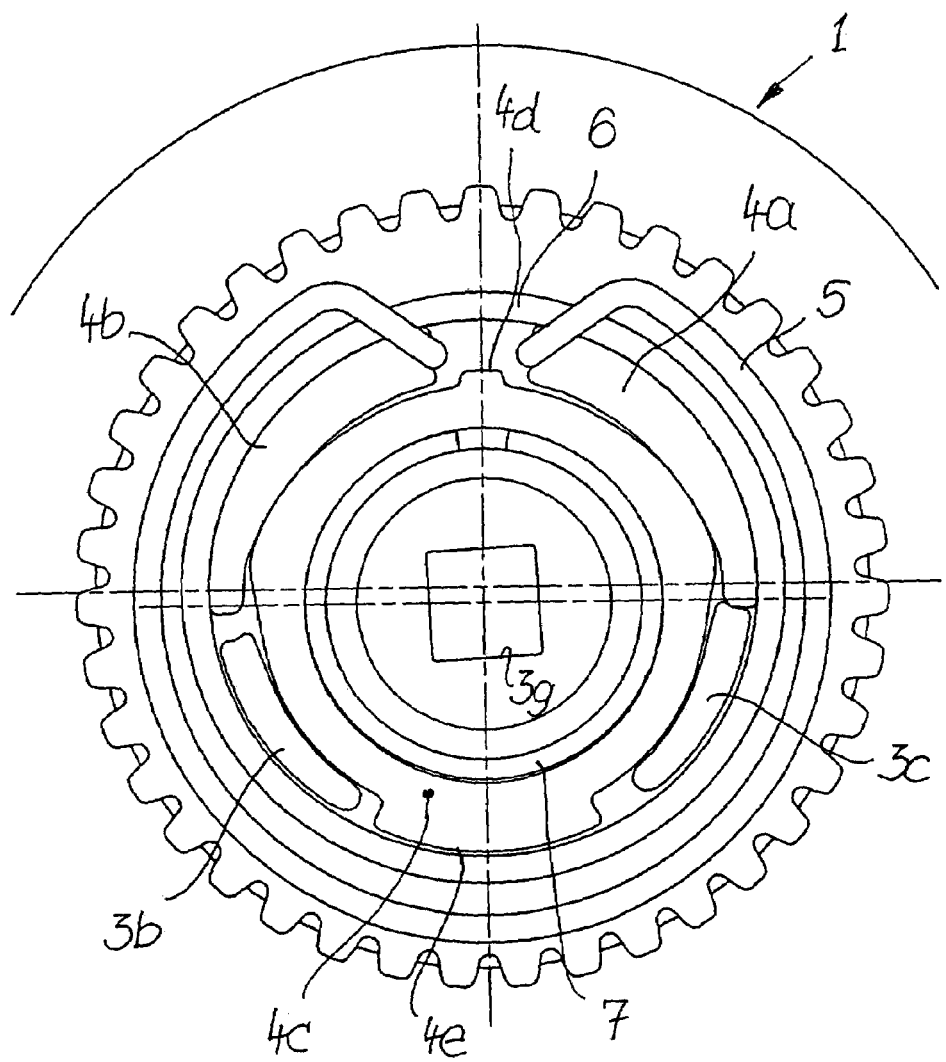
FIG. 5 is a front view of the adjustment fitting according to FIG. 4 with a follower of the rotating adjusting element rotated in a counter-clockwise direction until it rests against a wedge segment.
Figure 5A:
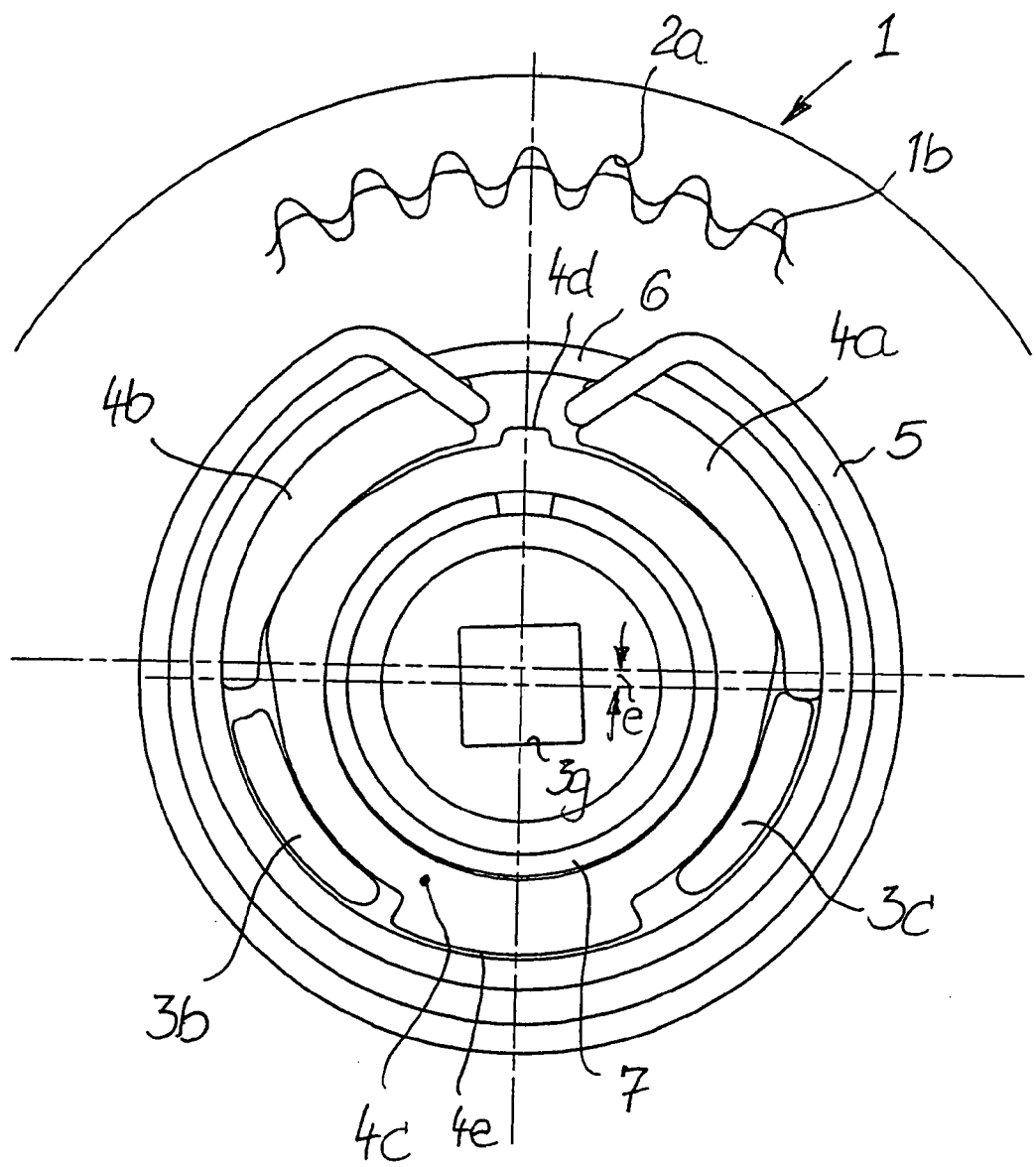
FIG. 5a is a front view of the adjustment fitting according to FIG. 5 showing only a portion of the mutually engaging rows of teeth on the two fitting parts engaged.

FIGS. 5 and 5a show the rotating adjusting element 3 and the followers 3b and 3c rotated counter-clockwise to the point that one of the followers 3b comes to rest, with no force, against the narrow face of the wedge segment 4a. In the positions shown in FIGS. 5 and 6, the two operational toothed areas 1b and 2a are tightly engaged with each other having little or no play. They are held in this position by the force of the Omega spring 5 that is transferred to the wedge segments 4a and 4b. Rotation of the rotating adjusting element 3 by means of an inner square hole 3g occurs with minimal force until the position shown in FIGS. 5 and 5a is achieved.

It is possible in the same manner to rotate the rotating adjusting element 3 clockwise to the point that one of the followers 3b rests against the narrow face of the wedge segment 4b. Minimal force is required to achieve this position.

Figure 6:
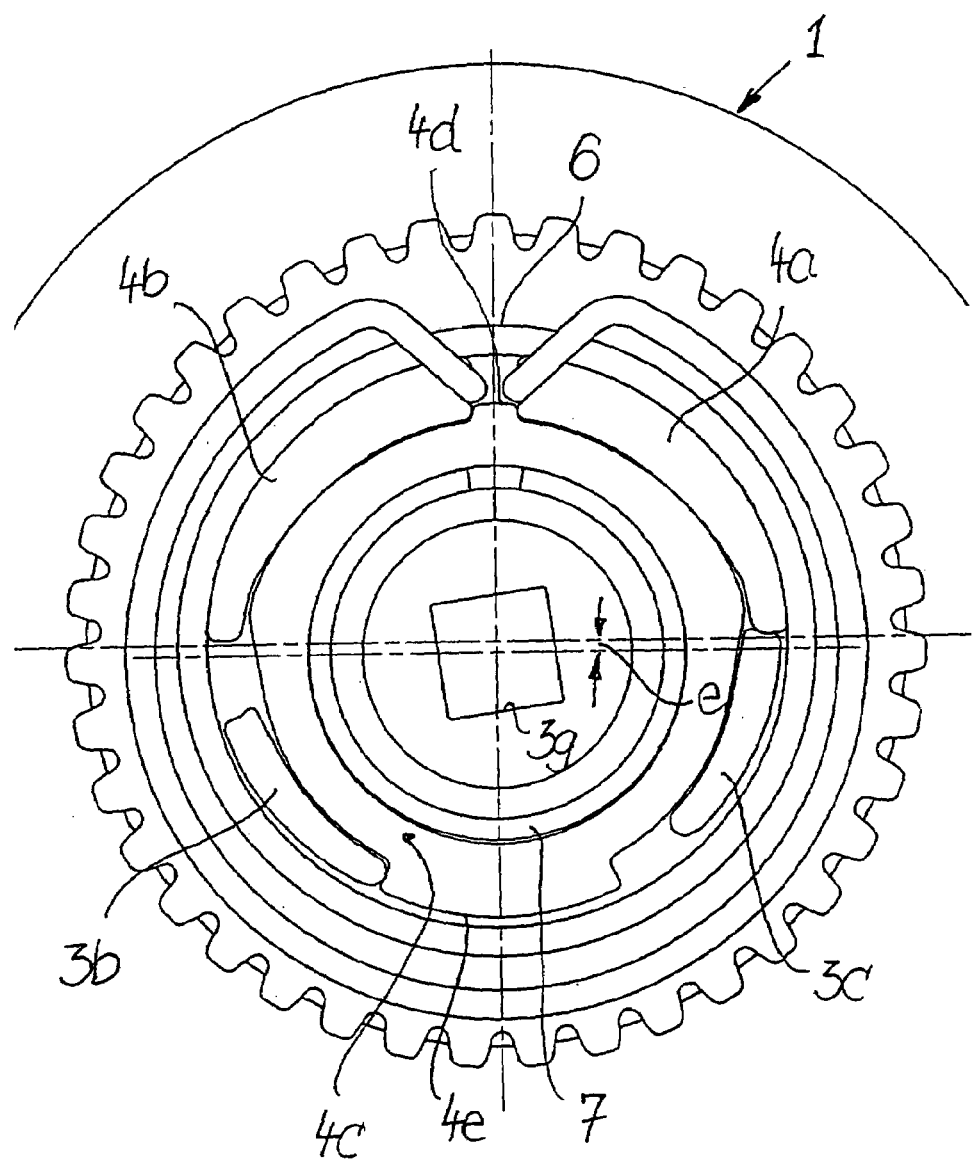
FIG. 6 is a front view of the adjustment fitting according to FIG. 5 with a rotating adjusting element rotated further than that shown in FIG. 5, wherein one of the followers has rotated a wedge on the eccentric ring, and the other follower, positioned before the wedge segment, is rotated by a rest notch of the eccentric ring and tensioned by a spring acting between wide faces of the wedge.
Figure 6A:
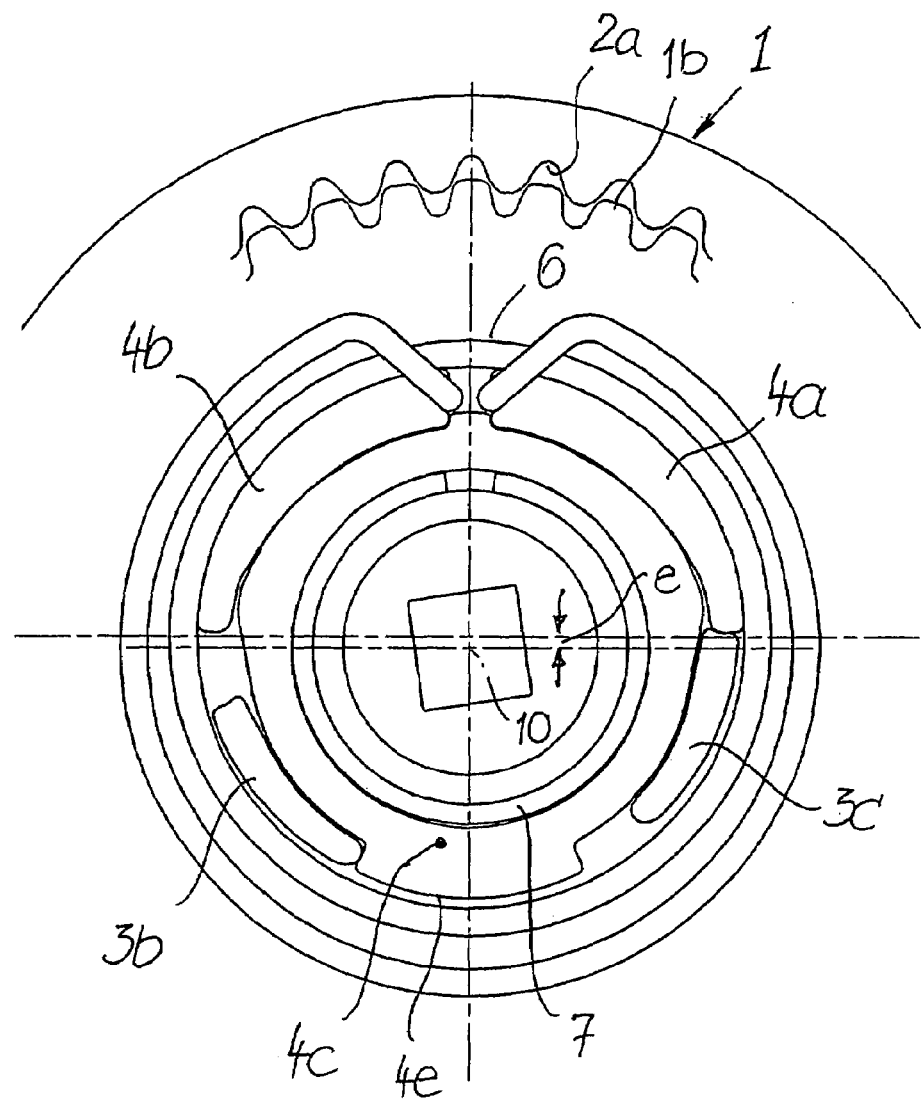
FIG. 6a is a front view of the adjustment fitting according to FIG. 6 showing only a portion of the mutually engaging rows of teeth on the two fitting parts engaged.

Upon further rotation of the rotating adjusting element 3 to the position beyond that shown in FIGS. 5 and 5a, the position seen in FIG. 6 or 6a is achieved. In this position, tension is increased on the Omega spring 5 such that the leg ends 5a and 5b rest more closely together. In the tightest position of the leg ends 5a and 5b, the wide faces of the wedge segments 4a and 4b each rest against a common rest notch of the eccentric ring 4c. Also, the follower 3b rests against a strike surface of the additional rest notch 4e of the eccentric ring 4c. In the position shown in FIGS. 6 and 6a, the operational toothed areas 2a and 1b are separated from each other, such that the wobble drive may be easily rotated in this separated position.

The eccentricity is designated with e in FIGS. 4 through 6a.

When the drive of the rotating adjusting element 3 is released, the two wide faces of the wedge elements 4a and 4b facing each other move away from each other due to the influence of the Omega spring 5, and the other components are moved to a position that corresponds roughly to that shown in FIGS. 5 and 5a, but in any case, a position in which the followers 3c or 3b (depending on direction of the rotation) rests against the narrow face of the adjacent wedge segment. Thus, a symmetrical configuration of the rest notch 4d is possible.

The eccentric ring 4c is mounted on the bearing shell 7 so that it may be displaced radially. The rest notch 4e remains a distance from the inner bearing surface of the bearing shell 6.

Modifications and substitutions by one of ordinary skill in the art are considered to be within the scope of the present invention, which is not to be limited except by the following claims.

The invention claim is:

1. An adjustment fitting for a seat back of an automobile seat, comprising:
    a fitting for operatively mounting to a moveable seat area;
    a rotatable fitting operatively connected to the fitting via a rotating adjusting device and for adjusting the fitting;
    an adjustment and locking mechanism, for adjusting the fixed fitting part and the fitting with respect to each other, wherein the fixed fitting part and the fitting are a wobble drive, and the rotating adjusting device includes a driven rotating adjusting element and an eccentric element rotatable about a swivel axis and an eccentric ring and a plurality of wedge segments tilted toward each other and crimped about an axis of rotation, wherein the plurality of wedge segments have sides urged apart by a spring; and
    wherein the eccentric ring is rotatable on a bearing shell and displaced radially, the bearing shell having an outer bearing surface of polymer polytetrafluoroethylene that grips a collar of the fixed fitting part that supports a collar of the driven rotating adjusting element so that the driven rotating adjusting element may rotate, wherein the rotating adjusting element includes a plurality of followers that rest on faces of the wedge segments and are displaced with respect to the eccentric ring.

2. The adjustment fitting according to claim 1, wherein the wedge segments have outer surfaces that rest on inner surfaces of a bearing shell, and wherein the bearing shell has a surface of Teflon.

3. The adjustment fitting according to claim 2, wherein the wedge segments are crimped on their outer surfaces, and the crimped outer surface corresponds to a crimping of the inner bearing of the bearing shell, and the surfaces in contact with each other rest flat against each other.

4. The adjustment fitting according to claim 3, wherein the collar supporting the driven rotating adjusting element is operatively mounted to the rotatable fitting part.

5. The adjustment fitting according to claim 4, wherein the eccentric ring has an outer surface at least partially covering the wedge segments that are in linear contact with the gripping wedge segments non-circular cylinder shape.

6. The adjustment fitting according to claim 5, wherein the eccentric ring has an inner circumference including a crimp that engages with a crimp of the bearing shell.

7. The adjustment fitting according to claim 6, wherein the eccentric ring includes a rest notch on the faces of the wedge segments in an upper apex of the eccentric ring.

8. The adjustment fitting according to claim 7, wherein the eccentric ring includes a second rest notch in a lower apex of the eccentric ring that engages the follower.

9. In an adjustment fitting for a seat back having a fixed fitting part for operatively mounting to the seat, a fitting for operatively mounting to a moveable seat area, a rotatable fitting operatively connected to the fitting via a rotating adjusting device and for adjusting the fitting; an adjustment and locking mechanism, for adjusting the fixed fitting part and the fitting with respect to each other, wherein the fixed fitting part and the fitting are a wobble drive, and the rotating adjusting device includes a driven rotating adjusting element and an eccentric element rotatable about a swivel axis and an eccentric ring and a plurality of wedge segments tilted toward each other and crimped about an axis of rotation, wherein the plurality of wedge segments have sides urged apart by a spring, wherein the improvement comprises:

the eccentric ring rotatable on a bearing shell and displaced radially;

the bearing shell having an outer bearing surface of polymer polytetrafluoroethylene that grips a collar of the fixed fitting part that supports a collar of the driven rotating adjusting element so that the driven rotating adjusting element may rotate; and wherein the rotating adjusting element includes a plurality of followers that rest on faces of the wedge segments and are displaced with respect to the eccentric ring.

* * * * *